United States Patent
Reynolds et al.

(10) Patent No.: US 7,437,417 B2
(45) Date of Patent: Oct. 14, 2008

(54) METHOD FOR PUBLISH/SUBSCRIBE MESSAGING

(75) Inventors: Andrew David Reynolds, Southampton (GB); Christopher Edward Sharp, Winchester (GB); Andrew James Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 10/547,724

(22) PCT Filed: Feb. 17, 2004

(86) PCT No.: PCT/GB2004/000611

§ 371 (c)(1),
(2), (4) Date: Sep. 1, 2005

(87) PCT Pub. No.: WO2004/080030

PCT Pub. Date: Sep. 16, 2004

(65) Prior Publication Data

US 2006/0167968 A1 Jul. 27, 2006

(30) Foreign Application Priority Data

Mar. 6, 2003 (GB) ................................ 0305066.3

(51) Int. Cl.
*G06F 15/16* (2006.01)
(52) U.S. Cl. ....................... 709/206; 709/202
(58) Field of Classification Search .................. 709/206
See application file for complete search history.

(56) References Cited

U.S. PATENT DOCUMENTS

| 6,021,443 | A | 2/2000 | Jankowski et al. |
| 6,405,266 | B1 * | 6/2002 | Bass et al. .................. 719/328 |
| 6,549,956 | B1 | 4/2003 | Bass et al. |
| 6,633,630 | B1 * | 10/2003 | Owens et al. ............ 379/93.24 |
| 6,721,779 | B1 * | 4/2004 | Maffeis ....................... 709/202 |
| 2003/0033283 | A1 | 2/2003 | Evans et al. |
| 2003/0135556 | A1 | 7/2003 | Holdsworth |

FOREIGN PATENT DOCUMENTS

WO WO 0205507 A 1/2002

OTHER PUBLICATIONS

"Linking instant messaging to publish/subscribe messaging" IBM Research Disclosure; Kenneth Mason Publications, Hampshire GB; vol. 438 No. 166; Oct. 2000.

* cited by examiner

*Primary Examiner*—Yves Dalencourt
*Assistant Examiner*—Michael C Lai
(74) *Attorney, Agent, or Firm*—Stephen R. Tkacs; Stephen J. Walder, Jr.; Herman Rodriguez

(57) ABSTRACT

The invention relates to a message brokering system for connecting a client in a local publish/subscribe messaging system to a remote message broker. The system comprises a message broker in said local publish/subscribe messaging system and a metabroker application means representing said remote message broker. The local message broker comprises publish/subscribe means for proxying messages between the client and the metabroker application means. The metabroker application means comprises publish/subscribe means for proxying messages between the local broker and the remote broker.

4 Claims, 1 Drawing Sheet

METHOD FOR PUBLISH/SUBSCRIBE MESSAGING

FIELD OF THE INVENTION

Figure 1:
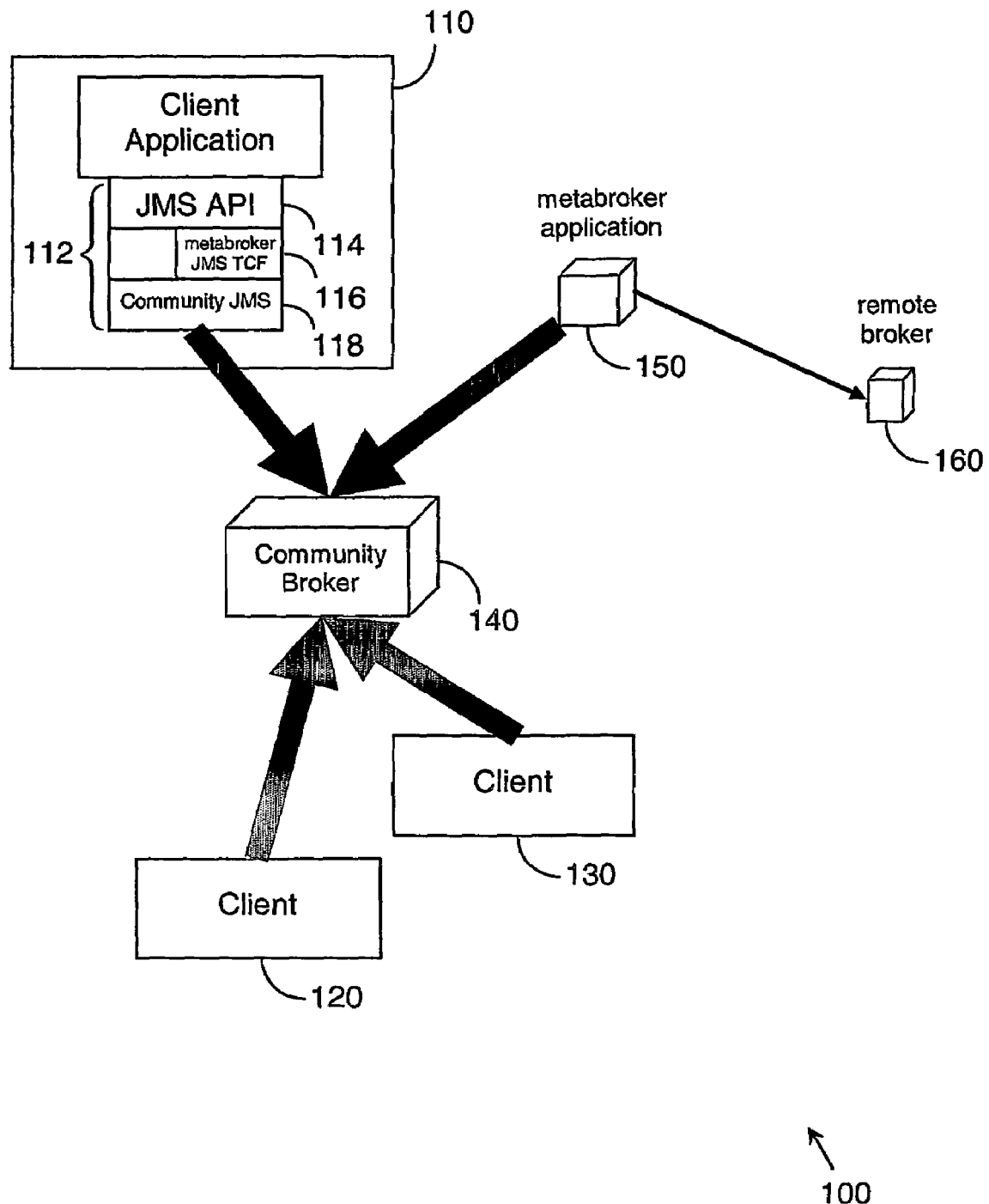

This invention relates to publish/subscribe (pub/sub) messaging systems.

BACKGROUND OF THE INVENTION

Publish and Subscribe is an effective way of disseminating information to multiple users. Publish/Subscribe (pub/sub) applications can help to enormously simplify the task of getting business messages and transactions to a wide, dynamic and potentially large audience in a timely manner.

In the field of this invention it is known that pub/sub applications are typically written so that a "community" of clients with a common purpose all connect in to a particular broker, to enable them to send and receive messages amongst themselves. An obvious example is producer/consumer applications, where one set of clients produce data and another set consume that data. Another example is in online gaming, where individual clients connect into a central "hub" to gain access to common services like billing, game updates, highscores, etc.

However, a problem with this arrangement is that the pub/sub architecture is "static": things become difficult if one of the clients needs to get access to some data which is being published to a different broker somewhere else in the world, for example, if it only occasionally needs to go to update some data table (e.g., average rainfall in some city over a year), or perhaps if an online gaming client needs to report a bug to the game manufacturer, or publish a new high 'high score' for global recognition.

On the World Wide Web, a user can easily 'jump off' the 'current' web server and go to a different one, simply by following a hyperlink. With Web Services, a user can look up the connection information for a service that the user wishes to make use of. However, heretofore, such alternate sourcing of information has not been possible for pub/sub.

It is possible for a client to disconnect from its "current" broker, and reconnect to a different one, but that assumes that all clients have "external" connectivity to allow them to reach the remote brokers, and in the closed world of (say) an online gaming system, that is often not the case (and there are reasons such as security why the clients should not be given such "general" access). So the problem to be solved is gaining pub/sub access to a remote broker given the restricted environment of a closed community pub/sub system.

A need therefore exists for users of a closed pub/sub community, connected to a central broker facility, to be able to exchange pub/sub messages with other, remote brokers, without gaining a direct connection to those brokers, wherein the abovementioned disadvantage(s) may be alleviated.

STATEMENT OF INVENTION

In accordance with a first aspect of the present invention there is provided a message brokering system for connecting a client in a local publish/subscribe messaging system to a remote message broker, the system comprising: metabroker application means representing said remote broker, said metabroker application means including publish/subscribe means for proxying messages between said client and said remote broker.

Preferably the means for proxying messages between a client and said remote broker comprises: means for receiving a message destined for the remote broker, wherein the message originates from the client; and means for forwarding said message to the remote broker.

Preferably the receiving means comprises: means for subscribing to receive messages addressed to the remote broker.

Preferably the means for proxying messages between a client and said remote broker comprises: means for receiving a message from the remote broker, said message destined for said client, the message brokering system further comprising: means for forwarding said message to the client.

Preferably the message brokering system further comprises means for receiving a subscription request from said client. The subscription request preferably indicates information that the client would like to receive from the remote broker. Preferably the metabroker application means comprising means for subscribing to receive such information from the remote broker.

Preferably the message brokering system further comprises means for forwarding messages from the remote broker to the client in accordance with the client's subscription request.

Preferably the subscription request indicates at least one topic about which the client would like to receive information.

According to another aspect, there is provided a method for connecting a client in a local publish/subscribe messaging system to a remote message broker, wherein a metabroker application means represents said remote broker, the method comprising: using publish/subscribe to proxy messages received at the metabroker application means between said client and said remote broker.

According to another aspect, there is provided a metabroker application for connecting a client in a local publish/subscribe messaging system to a remote message broker, wherein said metabroker application represents the remote broker, the metabroker application comprising program code means adapted to perform the step of: using publish/subscribe to proxy messages received at the metabroker application means between said client and said remote broker.

Note, the metabroker application could reside at a local broker in the local publish/subscribe messaging system. Alternatively it could be associated with the local broker.

According to another aspect, there is provided a message brokering system for connecting a client in a local publish/subscribe messaging system to a remote message broker, the system comprising: a message broker in said local publish/subscribe messaging system; and a metabroker application means representing said remote message broker, said local message broker comprising publish/subscribe means for proxying messages between the client and the metabroker application means, said metabroker application means comprising publish/subscribe means for proxying messages between the local broker and the remote broker.

According to another aspect, there is provided a client, in a local publish/subscribe messaging system, for connecting to a remote message broker, the client comprising: a client application comprising means for requesting a connection to a remote broker; connection means, responsive to said connection request, for publishing said request to a local message broker in said local publish/subscribe messaging system, said request to be received by a metabroker application means, said metabroker application means representing the remote broker.

The connection request from the client may comprise a request to publish a message to the remote broker. Alternatively, the connection request from the client may comprise a subscription request to receive certain information from the remote broker.

According to one embodiment, there is provided a publish/subscribe messaging system comprising: at least one client; a primary broker; and a secondary broker means, wherein the primary broker is arranged for publish/subscribe communication with the secondary broker means, and the at least one client is arranged to obtain information from the secondary broker means via publish/subscribe with the first broker.

In one embodiment, the secondary broker means comprises a meta-broker and a further broker, the meta-broker being arranged to act as a proxy for the further broker.

In one embodiment, the client comprises JMS service means for connecting to the secondary broker means. In one embodiment the JMS service means comprises UDDI means.

According to one embodiment, there is provided a method for publish/subscribe messaging in a system having at least one client; a primary broker; and a secondary broker means, the method comprising: communicating between the primary broker and the secondary broker means by publish/subscribe messaging; and obtaining, at the at least one client, information from the secondary broker means via publish/subscribe with the first broker.

Note, the invention may also be implemented in software.

Stated briefly, in a preferred form the present invention provides a mechanism for temporarily gaining the ability to publish and subscribe to data on a broker other than the one to which a user is "normally" connected, by making use of the pub/sub community broker, to which the user is already connected, and a new "proxy" application (here termed a "metabroker"), which acts as a gateway between the "community" broker and one or more remote brokers.

A significant advantage of this mechanism is that several clients connected to the "community" broker can make use of a single connection from the "metabroker" to the remote broker, which is useful if there are scalability, connectivity, or firewall issues—they can be dealt with by the metabroker on behalf of all the clients.

The remote broker service may be described and advertised through Web Services mechanisms such as Web Services Description Language (WSDL), Universal Description, Discovery and Integration (UDDI), etc., which gives a convenient way of locating and finding out how to establish a connection to the remote broker(s).

Such a system of "proxying" of messages to remote brokers via existing pub/sub connections, with connection details being obtained using a web-services style of lookup, may be considered a "heterogeneous multi-broker proxying on demand system with message broker web services".

BRIEF DESCRIPTION OF THE DRAWING(S)

One heterogeneous multi-broker proxying on demand system with message broker web services, incorporating a preferred embodiment of the present invention will now be described, by way of example only, with reference to the accompanying drawing(s), in which:

FIG. 1 shows a block schematic diagram of a publish system incorporating a preferred embodiment of the present invention.

DESCRIPTION OF PREFERRED EMBODIMENT

Referring to FIG. 1, a pub/sub messaging system 100 has a number of pub/sub clients (three of which, 110, 120 and 130 are shown) are each connected to their local "community" broker 140. A "metabroker" application 150 is also a client to the "community" broker 140, and is permanently connected and subscribes to the wildcard topic "metabroker/#", (where '#' is the topic wildcard symbol), so that it receives all messages that have topics prefixed with the name "metabroker", e.g.: metabroker/a/b.

When a client application wishes to gain access to a remote broker 160, it requests a connection to the "metabroker" Java Message Service (JMS) service (Java and all Java-based trademarks are trademarks or registered trademarks of Sun Microsystems, Inc. in the United States, other countries, or both.)

This JMS service is in practice a software library 112 (comprising a JMS API—Application Programming Interface—114, a metabroker JMS TopicConnectionFactory (TCF) 116 and a community JMS TCF 118) running on the client, which gives the client application the impression that it is making a connection to a remote broker, but is in fact making use of the "normal" (existing) connection to the community broker 140 to send special messages to the metabroker 150, by publishing messages to the community broker 140 which the metabroker 150 receives as a subscriber. The metabroker 150, in turn, connects to the required remote broker 160 and proxies messages back and forth to the client application 110, all via pub/sub through the community broker 140. In effect, this may considered as "pub/sub over pub/sub".

When creating the JMS connection object, the client application passes as parameters an identifier for the remote broker service the user wishes to make use of. This might be explicit, as an IP address and port, or a domain name and port, or it might be a "service name", which would be treated as a Web Service service name, and a UDDI lookup is performed to resolve the connection information for that broker service. It will be understood that there are a number of ways of mapping from "service names" to physical connection details, UDDI being simply an example.

The JMS implementation for the metabroker service uses the existing connection to the community broker 140 to which the client is usually attached to flow messages to and from the metabroker application. This might be through a JMS interface, or some other messaging capability which supports a publish/subscribe messaging model.

Below there is described one possible implementation of topics and message structures which could be used to implement a pub/sub messaging model, through the metabroker application, through a pub/sub messaging system. In the following description it is assumed that message bodies would use a suitably structured data representation, e.g. XML, or name/value pairs. When the action of the client is described, it is to be understood that this is the client-side implementation of the metabroker JMS service, typically implemented as a library which the client application accesses. The action of the metabroker application is explained where needed for clarification. The client application will simply make the usual JMS API calls to publish and subscribe to data on the remote broker to which it is logically attached, unaware of the proxying via the community broker which is happening in the JMS library layer (i.e. 112 in the figure).

In other words, the client application already knows how to reach the community broker (or knows which directory to ask for instructions on how to connect—e.g. Java Naming and Directory Interface lookup). The community broker communicates with the metabroker application using publish/subscribe and the meta broker application makes the connection to the remote broker.

Connect

In response to a "connect" request from the application, the client sends:

topic: metabroker/request/connect message:
   identification information of remote broker to which metabroker is to connect on behalf of this client (could be an IP address and port, or a Web Services service name, which the metabroker would resolve to an IP address and port using a UDDI directory enquiry)
   possible authentication information (e.g. user ID, password)
   client unique identifier (for temporary use) (client UID)

the client subscribes to topic: metabroker/response/{client UID}/connack
   Upon successful address resolution and connection to the remote broker, the metabroker application publishes a message to the community broker:

topic: metabroker/response/{client UID}/connack message:
   result code, indicating whether the connection to the remote broker by the metabroker application was successful
   session identifier (session ID)
   Assuming a successful connection (indicated by the return code), the client un-subscribes in the community broker from:

metabroker/response/{client UID}/connack and subscribes in the community broker to:

metabroker/response/(session ID)/#

(i.e., any topic which starts with metabroker/response/{session ID}/)
   The client receives the response message from the metabroker (due to its subscription), and is able to notify the application of the outcome of the request through the appropriate JMS return code.

Publish

In response to a "publish" request from the application, the client sends:

topic: metabroker/request/{sessionID}/publish message:
   topic passed from application
   message body passed from application
   quality of service/persistence delivery instruction flags
   client message identifier (message ID)
   When the message has been successfully published by the metabroker application to the remote broker, the metabroker publishes a message to the community broker:

topic: metabroker/response/{session ID}/puback message:
   message ID
   possibly a result code
   The client receives this message (due to its subscription), and is able to notify the application of the outcome of the request through the appropriate JMS return code.

Subscribe

In response to a "subscribe" request from the application, the client sends topic: metabroker/request/{session ID}/subscribe message:
   topic(s) requested by application
   other subscription flags (e.g., quality of service, durability)
   client message ID (message ID)
   The metabroker receives this message and subscribes to the requested topic(s) on behalf of the client.
   When the remote subscription is acknowledged, the metabroker publishes a message to the community broker:

topic: metabroker/response/{session ID}/suback message:
   message ID
   subscription confirmation result code
   The client receives this message (due to its subscription), and is able to notify the application of the outcome of the request through the appropriate JMS return code.

Unsubscribe

UNSUBSCRIBE is implemented in a similar same way to SUBSCRIBE, and need not be described further.

Incoming Publication

When the metabroker receives a message from the remote broker, which is destined for one of the community broker clients that has a remote broker session through the metabroker application, it determines (using a lookup table, and possibly a publication "matching engine" not shown) which client this message is for, and publishes a message to the community broker:

topic: metabroker/response/{session ID}/publish message:
   topic
   message body The client application receives the message and invokes the appropriate mechanism to notify the application that an incoming message has been received which matches the subscription that was placed earlier.

Note, the remote broker sends a copy of a publication message to each client that has registered an interest (subscribed). The metabroker application is one such subscribee and has subscribed on behalf of its clients, based on their "subscribe" request(s) via the community broker.

Some brokers (or rather some connection protocols) allow messages to be held for a subscriber even if they're not actually connected at that time. Thus the metabroker might (if it was using such a protocol) subscribe to some topics on behalf of one of its clients, and then get disconnected, and come back later to the broker and collect the messages that match its subscription, and then can forward them to its clients. IBM's WebSphere MQ is one such protocol. Such subscriptions are known as "durable subscriptions", i.e. they "last" even when the client disconnects, and they have to be explicitly cancelled (unsubscribed) when no longer required.

Disconnect
==========

When the client requests a disconnection from the remote broker, the client libraries publish the message:

topic: metabroker/request/{session ID}/disconnect

After disconnecting from the remote broker, the metabroker publishes a message to the community broker:

topic: metabroker/response/(session ID)/discack

The client receives this message (due to its subscription), and is able to notify the application of the outcome of the request through the appropriate JMS return code.

The client then unsubscribes in the community broker from:

metabroker/response/{session ID}/#

It will be understood that the heterogeneous multi-broker proxying on demand system with message broker web services described above provides the following advantages:

Clients connected to the "community" broker can gain access to a remote pub/sub broker, without needing a direct network connection to it, by making use of its single, existing connection to the "community" broker.

Several clients connected to the "community" broker can make use of a single connection from the "metabroker" to the remote broker, which is useful if there are scalability, connectivity, or firewall issues—they can be dealt with by the metabroker on behalf of all the clients.

The remote broker service may be described and advertised through Web Services mechanisms such as WSDL, UDDI, etc., which gives a convenient way of locating and finding out how to establish a connection to the remote brokers.

It will be appreciated that the method described above for publish/subscribe messaging may be carried out in software running on a processor (not shown), and that the software may be provided as a computer program element carried on any suitable data carrier (also not shown) such as a magnetic or optical computer disc.

In summary, it will be understood that the heterogeneous multi-broker proxying on demand system with message broker web services described above provides the advantage that clients connected to a community broker can gain access to a remote pub/sub broker, without needing a direct network connection to it, by making use of its single, existing connection to the "community" broker. Also, several clients connected to a community broker can make use of a single connection from the "metabroker" to the remote broker, which is useful if there are scalability, connectivity, or firewall issues—they can be dealt with by the metabroker on behalf of all the clients. The remote broker service may be described and advertised through Web Services mechanisms such as WSDL, UDDI, etc., which gives a convenient way of locating and finding out how to establish a connection to the remote broker(s).

The invention claimed is:

1. A computer implemented method for connecting a client in a local publish/subscribe messaging system to a remote broker, wherein a metabroker application is a client of a community broker that is local to a plurality of clients and represents said remote broker, the method comprising:

using a publish/subscribe messaging system to proxy messages received at the metabroker application between the plurality of clients and said remote broker, wherein proxying messages between the plurality of clients and said remote broker comprises:

i) receiving a message, originating at a given client within the plurality of clients and destined for the remote broker, by subscribing to the community broker in order to receive such messages, and forwarding the received message to the remote broker; and ii) publishing a message received from a remote broker to the community broker using a topic designated as a topic for remote broker messages, thereby enabling a subset of clients within the plurality of clients to subscribe to the topic at the community broker in order to receive messages from the remote broker, wherein each of the plurality of clients has a software library that converts messages intended for the remote broker to special messages to the community broker and wherein the metabroker application receives the special messages as a subscriber;

wherein the software library publishes the special messages to one or more metabroker wildcard topics and wherein the metabroker application subscribes to receive messages published to the one or more metabroker wildcard topics; and wherein the metabroker application publishes messages to the one or more metabroker wildcard topics and wherein the software library receives messages published to the one or more metabroker wildcard topics.

2. The method of claim 1 comprising:

receiving a subscription request from the given client, said subscription request indicating information that the given client would like to receive from the remote broker; and the metabroker application subscribing to receive such information from said remote broker.

3. The method of claim 2 comprising:

forwarding messages from the remote broker to the given client in accordance with the given client's subscription request.

4. The method of claim 1, wherein a given message is a connection request, a publish request, a subscribe request, an unsubscribe request, or a disconnect request.

* * * * *